J. H. LANDELL.

Tent-Fixture.

No. { 142, 1,245. }

Reissued Dec. 17, 1861.

Witnesses
Wm. M. Gooding
C. M. Pepper

Inventor
John H. Landell

N. PETERS, PHOTO-LITHOGRAPHER, WASHINGTON, D. C.

UNITED STATES PATENT OFFICE.

JOHN H. LANDELL, OF NEWARK, NEW JERSEY.

IMPROVEMENT IN TENT-FIXTURES.

Specification forming part of Letters Patent No. 32,481, dated June 4, 1861; Reissue No. 1,215, dated December 17, 1861.

*To all whom it may concern:*

Be it known that I, JOHN H. LANDELL, of Newark, in the county of Essex and State of New Jersey, have invented certain new and useful Improvements in Tent-Fixtures; and I do hereby declare that the following is a full, clear, and exact description of the same, reference being had to the annexed drawings, making part of this specification, in which—

Figure 1:
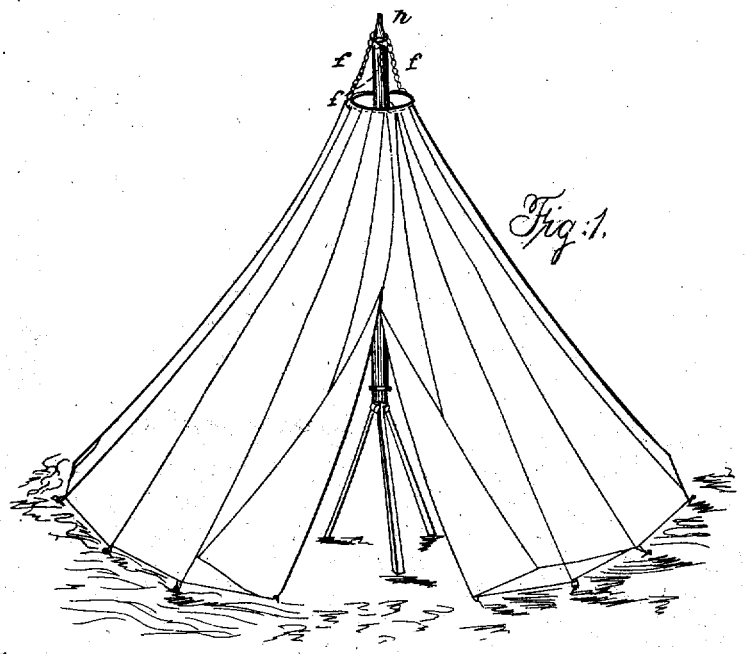
Figure 2:
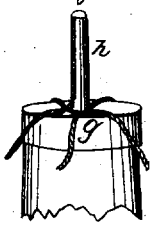
Figure 3:
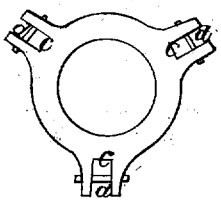
Figure 4:
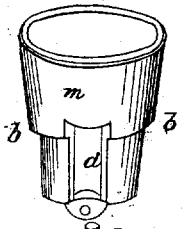
Figure 5:
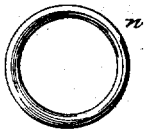
Figure 6:
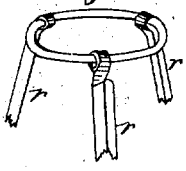
Figure 7:
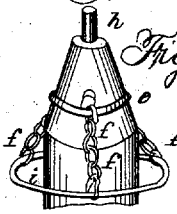

Figure 1 is a tent in elevation with my improvement attached. Fig. 2 is a view of a top of a tent-pole constructed according to the old plan. Fig. 3 is the common or old fixture for the top ends of the legs of the tripod. Fig. 4 represents my improved thimble or ferrule, which is fitted on the lower end of the tent-pole. Fig. 5 is a detached view of the ring which fits on the thimble; Fig. 6, the same ring with the tripod attached thereto. Fig. 7 is the top of a tent-pole constructed and arranged according to my invention.

Similar letters of reference indicate corresponding parts in the several figures.

The nature of this invention and improvement consists in a mode of attaching the legs of the tripod to the tent-pole, which provides for an easy repair in case of accident in the field and the better securing of the tent to the top of the pole.

In the ordinary manner the thimble or ferrule *m*, Fig. 4, is made without the slots *a*, and Fig. 3 slips on from the bottom, resting against the shoulder *b*, Fig. 4, and the legs of the tripod were fitted in the slots *c*, Fig. 3, and were held in place by the pins *d*.

As Fig. 3 was made of cast or of malleable iron, in haste of erection ears of the slot would occasionally be broken off, and could not be repaired in the field without overloading the stores with a stock of new fixtures. The upper ends of the legs had also to be made heavy to insure strength to hold and to stand hasty handling.

I substitute for the holder, Fig. 3, the ring *n*, Figs. 5 and 6, which slips on the thimble up to the shoulder *b*, and having the three legs *r* of the tripod bent over it, as in Fig. 6, it takes much less iron in the legs to preserve the same strength, and as the ring is wrought iron it is not likely to be broken, but should such an accident happen it can be easily repaired at the field-forge. The slots *a* (of which there are three equidistant on the thimble or ferrule, one only being shown in the drawings), are provided to receive and keep in place the ends of the legs of the tripod, which are turned over the ring.

For the top of the pole a conical ferrule with three slots in it is provided. (See Fig. 7.) A galvanized wrought-iron ring, *e*, is fitted to it, to which ring three welded wrought-iron chains, *f*, are attached by links welded together on the ring. To the other end of the chains *f* a large wrought-iron ring, *i*, is attached in the same manner, the larger ring being securely attached to the canvas of the tent.

In the ordinary fixtures of tents six ropes are fastened to a small ring, which ring *g* is put over the pin *h* in the top of the pole, the ropes being fast at the other end to a hoop of wood or iron, involving the working of six holes in the canvas for the ropes to pass through after the canvas is stitched to the hoop. In the new method there is no working of holes, and these chains insure the holding the top of the tent with an equal strain on each to meet the contraction of the canvas by wet without breaking.

Having thus described my invention, what I claim as new, and desire to secure by Letters Patent, is—

1. The combination of the conical ferrule with the rings, or either of them, in the manner described.

2. Constructing the tripod which supports the tent-pole of a ring of sufficient diameter to receive the ferrule of the lower end of the pole, and having legs attached, in the manner described.

3. The combination of the tripod, constructed as described, with the ferrule fitted on the lower end of the tent-pole, in the manner described.

JOHN H. LANDELL.

Witnesses:

M. M. LIVINGSTON,

JAMES LAIRD.